United States Patent [19]

Baumann et al.

[11] Patent Number: 4,941,679
[45] Date of Patent: Jul. 17, 1990

[54] AXIALLY ADJUSTABLE STEERING DEVICE FOR MOTOR VEHICLES

[75] Inventors: Karl-Heinz Baumann, Bondorf; Herbert Holtze, Weil der Stadt; Martin Wünsche, Bad Schwalbach; Wolfgang Schwede, Sindelfingen, all of Fed. Rep. of Germany

[73] Assignee: Daimler-Benz AG, Fed. Rep. of Germany

[21] Appl. No.: 371,753

[22] Filed: Jun. 27, 1989

[30] Foreign Application Priority Data

Jul. 2, 1988 [DE] Fed. Rep. of Germany ....... 3822460

[51] Int. Cl.$^5$ .............................................. B62D 1/18
[52] U.S. Cl. ...................................... 280/775; 74/493
[58] Field of Search ............................ 280/775; 74/493

[56] References Cited

U.S. PATENT DOCUMENTS

| | | | |
|---|---|---|---|
| 4,602,520 | 7/1986 | Nishikawa et al. | 280/775 |
| 4,691,587 | 8/1987 | Farrand et al. | 280/775 |
| 4,716,780 | 1/1988 | Nishikawa et al. | 280/775 |
| 4,785,864 | 11/1988 | Nishikawa et al. | 280/775 |

FOREIGN PATENT DOCUMENTS

2407932 8/1974 Fed. Rep. of Germany.
3318935 12/1984 Fed. Rep. of Germany.
3544345 7/1986 Fed. Rep. of Germany.

*Primary Examiner*—Kenneth R. Rice
*Attorney, Agent, or Firm*—Evenson, Wands, Edwards, Lenahan & McKeown

[57] ABSTRACT

An axially adjustable steering device for motor vehicles comprises two jacket-tube parts, of which the inner jacket-tube part is displaceable telescopically in the outer jacket-tube part by means of a controllable drive, a worm gear received in a reception part pivotably mounted fixedly relative to the vehicle acting on an axial tooth-profile part on the inner jacket-tube part in a longitudinally displacing manner. The reception part is retained via a locking mechanism in an engagement position of the worm gear and tooth-profile part, and this locking mechanism is releasable in a controlled manner during a front collision, after which the worm gear is pivoted out of engagement with the tooth-profile part and the inner jacket-tube part is moveable into a position shifted furthest in the forward direction.

7 Claims, 2 Drawing Sheets

AXIALLY ADJUSTABLE STEERING DEVICE FOR MOTOR VEHICLES

BACKGROUND AND SUMMARY OF THE INVENTION

The invention relates to an axially adjustable steering device for motor vehicles, which comprises two jacket-tube parts of which an outer jacket-tube part is secured to the body and an inner jacket-tube part, in which a steering shaft is fixed axially, is displaceable telescopically in the outer jacket-tube part by means of a controllable drive, a driven worm gear mounted in a reception part engaging into a tooth-profile part extending axially on the displaceable inner jacket-tube part and acting on the latter in a longitudinally displacing manner, a reception part of the worm gear being pivotably mounted fixedly relative to the vehicle and being retained via a locking means in an engagement position of the worm gear and tooth-profile part.

German Patent Specification No. 3,318,935 makes known an axially adjustable steering device for motor vehicles, which comprises two telescopically overlapping jacket-tube parts displaceable relative to one another as a result of the engagement of a driven worm gear into a tooth-profile part on the inner jacket-tube part, in which a steering shaft is fixed axially. The worm gear is mounted in a reception part which is itself mounted pivotably on the outer jacket-tube part fixed relative to the vehicle. To secure an engagement position of the worm gear and tooth profile part, the reception part is retained on the outer jacket-tube part by a locking means, such as, for example, a slot adjustment means.

According to recent findings in vehicle building, the seriousness of the injury to the vehicle driver in the event of a front collision can be reduced if the steering wheel is moved as far as possible away from his body, so that he strikes the steering wheel as late as possible and at only very low speed, if at all.

An object on which the invention is based is, during a front collision, to allow an axially adjustable steering device of the relevant generic type to be displaced into a position shifted furthest in the front direction.

The object is achieved by providing an arrangement wherein the locking means is releasable in a controlled manner during a front collision, and wherein the worm gear is thereafter pivoted out of engagement with the tooth-profile part, with the result that the inner jacket-tube is movable into a position shifted furtherst in the direction of the vehicle front.

In the event of a front collision triggering a control pulse, the lock of the reception part is released automatically and thereby allows the worm gear to pivot away from the tooth-profile part, after which the inner jacket-tube part is no longer supported on a component mounted fixedly relative to the vehicle. The inner jacket-tube part can now be transferred into a position shifted furthest in the direction of the vehicle front, with the result that the vehicle driver can be protected from a rapid impact against the steering wheel.

A favorable design of a locking means releasable in a controlled manner is obtained by means of an electrical separating screw which, in a known way, has a screw portion with an explosion means which, after being ignited by a crash pulse, causes the screw to be severed at a specific separation point. This separation point is located in the region of mutually contiguous surfaces of the outer jacket-tube part and of the reception part locked on it by means of the separating screw, so that after the controlled severance of the separating screw it becomes possible for the worm gear to pivot away from the tooth-profile part immediately.

After this, without further means being required, the steering wheel can move in the front direction either solely as a result of the inertia forces of the displaceable parts or by means of the body forces of the vehicle driver.

For this purpose, the reception part must be arranged pivotably in such a way that it executes the necessary pivoting movement either automatically as a result of its own weight, with the assistance of a spring loading it, or else as a result of the expulsive force of the tooth-profile part on which force is exerted.

According to advantageous features of preferred embodiments the steering device possesses an element which absorbs energy and which can be formed by a hydraulic damper acting, during the displacement of the jacket-tube parts, with the effect of damping the speed of displacement of the inner jacket-tube in the front direction by counteracting the inertia forces of the displaceable parts after a front collision and, as appropriate, also some of the body forces introduced at the steering wheel. Consequently, even after the worm gear has pivoted away and during the displacement movement of the steering shaft together with the steering wheel in the direction of the vehicle front, the vehicle driver still always has the possibility of support on the steering wheel, with the result that the load exerted by the belt and the maximum value of the relative speed between the vehicle and the vehicle driver can be kept lower.

Other objects, advantages and novel features of the present invention will become apparent from the following detailed description of the invention when considered in conjunction with the accompanying drawings.

DETAILED DESCRIPTION OF THE DRAWINGS

Figure 1:
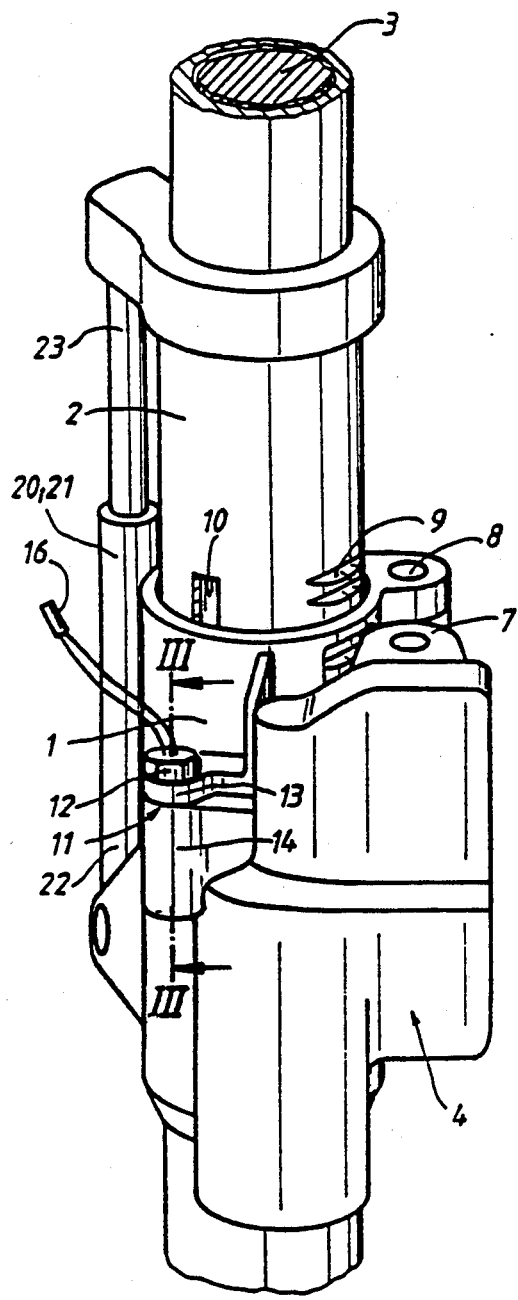
FIG. 1 is a perspective partial side view which shows part of an axially adjustable steering device of a motor vehicle with an adjusting drive, constructed according to a preferred embodiment of the invention.
Figure 2:
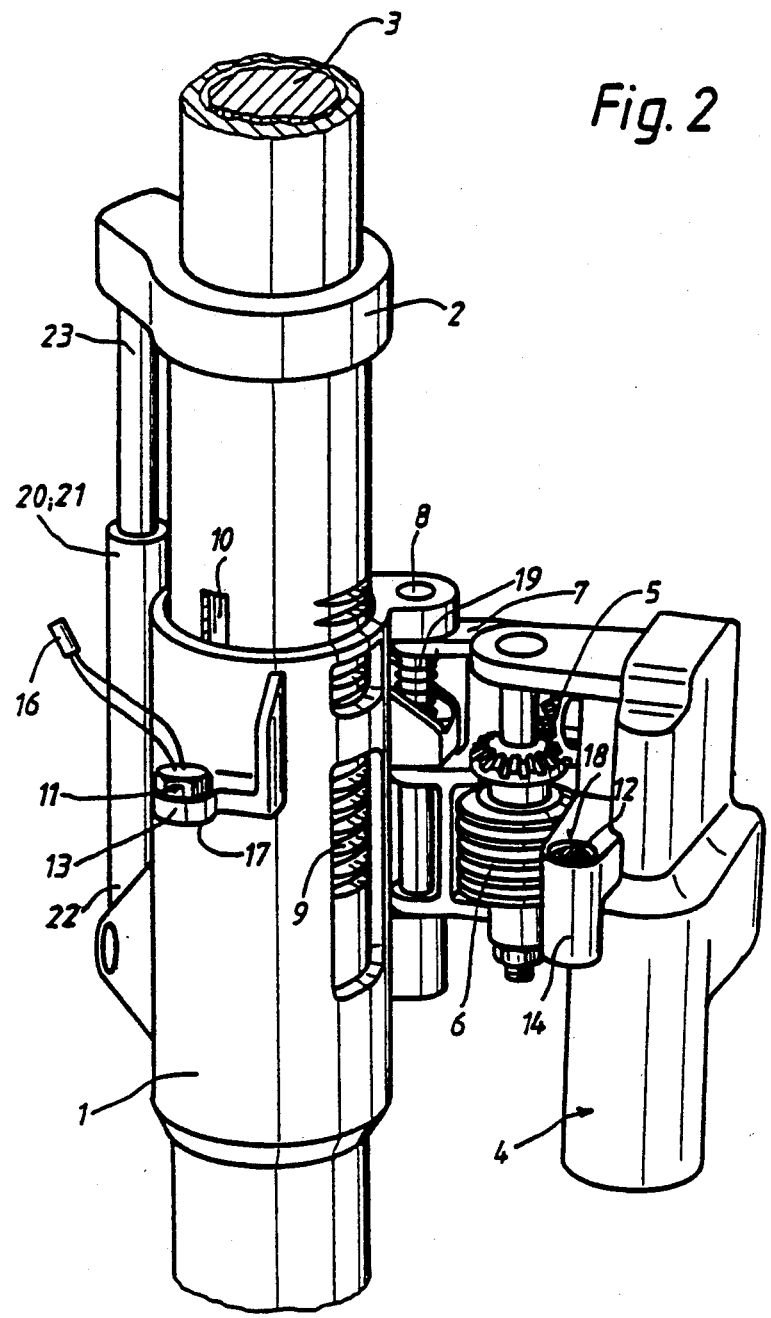
FIG. 2 shows the steering device of FIG. 1 after the transmission of a crash pulse and with the worm gear pivoted out of engagement.

FIGS. 1 and 2 show a portion of an axially adjustable steering device for motor vehicles, which comprises two jacket-tube parts 1 and 2, and of which an outer jacket-tube part 1 is fastened to the body in a way not visible in the drawing and an inner jacket-tube part 2, in which a rotatable steering shaft 3 is fixed axially, is displaceable telescopically in the outer jacket tube part 1 by means of a drive 4.

This drive 4 shown in simplified form acts on a gear 5 which possesses a worm 6 as an output member.

The drive 4 and the gear 5 are mounted in a reception part 7 which is itself fastened pivotably, via an axle pin 8, to the outer jacket-tube part 1 fixed relative to the vehicle.

In order to obtain an axial displacement of the inner jacket-tube part 2, together with the steering shaft 3 and a steering wheel (not shown) connected to it, the worm 6 engages into a tooth-profile part 9 which extends axially on the inner jacket-tube part 2 and which here is formed by a rack profile shaped into the casing of the inner jacket-tube part 2. A rotation of the inner jacket-tube part 2 in the outer jacket-tube part 1 is prevented by the engagement of a nose (not shown) on the inner face of the outer jacket-tube part 1 into a longitudinal guide groove 10 in the inner jacket tube part 2.

The engagement of the worm 6 into the tooth-profile part 9, bringing about a self-locking of the displacement of the jacket-tube parts 1,2, is fixed by the reception part 7 which is retained in this pivoted position by a locking means 11.

Figure 3:
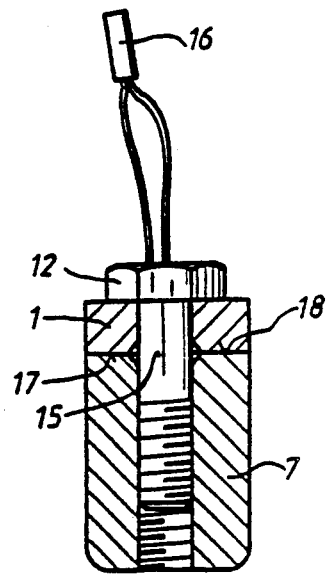
FIG. 3 shows a means of locking the reception part on the outer jacket-tube part in section along the line III—III of FIG. 1.

The locking means 11 is formed, here, by an electrical separating screw 12 which passes through a web 13 formed on the outer jacket-tube 1 and which is then screwed into a bush 14 on the reception part 7. This electrical separating screw 12, shown in detail in FIG. 3, contains in a known way a screw portion 15 with an explosion means which, after being ignited by an electrical pulse at the terminal 16, causes the separating screw 12 to be severed in this screw portion 15. The screw portion 15 with the intended separating point is arranged in the region of mutually contiguous surfaces 17, 18 of the outer jacket-tube part 1 and of the reception part 7 retained on it.

During a front collision and after a crash pulse has thereby been triggered at the terminal 16, the separating screw 12 is severed in the screw portion 15, with the result that the reception part 7 is pivotable away from the outer jacket-tube part 1. At the same time, the reception part 7 is assisted by a spring 19, and the pushing inner jacket-tube part 1. At the same time, the reception part 7 is assisted by a spring 19, and the pushing inner jacket-tube part 1, by means of its tooth-profile part 9 presses the worm 6 out of engagement.

In this position as shown in FIG. 2, the inner jacket-tube part 2 can be displaced as far as possible in the direction of the vehicle front, which here would have to be located approximately at the lower edge of the picture. As a result of this, in the event of a front collision triggering a control pulse the steering shaft 3 together with the steering wheel is displaceable away from the vehicle driver who can thereby be protected from a rapid impact against the steering wheel.

So that, even after the worm 6 has been pivoted away and during the displacement movement of the steering shaft 3 together with the inner jacket-tube 2 in the direction of the vehicle front, the vehicle driver still always has the possibility of support on the steering wheel, thus keeping the load exerted by the belt and the relative speed of the vehicle driver in relation to the vehicle lower, the inertia forces of the displaceable parts, acting unrestrainedly after the pivoting away of the worm 6, are counteracted by an energy-absorbing element 20. This is formed here by a hydraulic damper 21 which is fastened to the outer jacket-tube part 1 by means of one cylinder end 22 and to the inner jacket-tube part 2 by means of a piston-rod end 23 and which damps the speed of displacement of the inner jacket-tube part 2 relative to the outer jacket-tube part 1 in the direction of the vehicle front.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Axially adjustable steering device for motor vehicles, which comprises two jacket-tube parts of which an outer jacket-tube part is secured to the body and an inner jacket-tube part, in which a steering shaft is fixed axially, is displaceable telescopically in the outer jacket-tube part by means of a controllable drive, a driven worm gear mounted in a reception part engaging into a tooth-profile part extending axially on the displaceable inner jacket-tube part and acting on the latter in a longitudinally displacing manner, a reception part of the worm gear being pivotably mounted fixedly relative to the vehicle and being retained via a locking means in an engagement position of the worm gear and tooth-profile part, wherein, the locking means is releasable in a controlled manner during a front collision, and wherein the worm gear is thereafter pivoted out of engagement with the tooth-profile part with the result that the inner jacket-tube part is movable into a position shifted furtherest in the direction of the vehicle front.

2. Axially adjustable steering device according to claim 1, wherein the locking means is formed by an electrical separating screw which is severed by means of a crash pulse in the region of mutually contiguous surfaces of the outer jacket-tube part and of the reception part retained thereon.

3. Axially adjustable steering device according to claim 1, wherein the reception part is loaded by a spring by means of which the worm gear is pivotable out of engagement.

4. Axially adjustable steering device according to claim 2, wherein the reception part is loaded by a spring by means of which the worm gear is pivotable out of engagement.

5. Axially adjustable steering device according to claim 1, wherein the inner jacket-tube part is displaceable in the direction of the vehicle front as a result of inertia forces of the displaceable parts and body forces of a vehicle driver which occur during a collision.

6. Axially adjustable steering device according to claim 1, wherein an element absorbing energy during the displacement movement of the inner jacket-tube part and counteracting the inertia forces of the displacement parts acts between the jacket-tube parts 7. Axially adjustable steering device according to claim 6, wherein the element is formed by a hydraulic damper which, when the worm gear is pivoted away, damps the speed of displacement of the inner jacket-tube part in the direction of the vehicle front.

* * * * *